United States Patent
Binder et al.

(10) Patent No.: US 10,658,680 B2
(45) Date of Patent: May 19, 2020

(54) SYSTEMS AND METHODS OF HEAD-MOUNTED DEVICES WITH MIXED CAPACITY CELLS

(71) Applicant: Microsoft Technology Licensing, LLC, Redmond, WA (US)

(72) Inventors: Julian Binder, Boulder Creek, CA (US); Daniel Chian, Los Altos, CA (US); Vijayasekaran Boovaragavan, Cupertino, CA (US); Dongli Zeng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 15/675,333

(22) Filed: Aug. 11, 2017

(65) Prior Publication Data

US 2019/0051911 A1 Feb. 14, 2019

(51) Int. Cl.
| | |
|---|---|
| *H01M 6/42* | (2006.01) |
| *H01M 2/24* | (2006.01) |
| *H01M 2/02* | (2006.01) |
| *H01M 10/04* | (2006.01) |
| *H01M 2/10* | (2006.01) |
| *G02B 27/01* | (2006.01) |
| *H01M 10/6552* | (2014.01) |
| *H01M 2/20* | (2006.01) |

(52) U.S. Cl.
CPC .......... *H01M 6/42* (2013.01); *G02B 27/017* (2013.01); *H01M 2/02* (2013.01); *H01M 2/1005* (2013.01); *H01M 2/1027* (2013.01); *H01M 2/24* (2013.01); *H01M 10/0436* (2013.01); *G02B 2027/0178* (2013.01); *H01M 2/204* (2013.01); *H01M 10/6552* (2015.04); *H01M 2220/30* (2013.01)

(58) Field of Classification Search
None
See application file for complete search history.

(56) References Cited

U.S. PATENT DOCUMENTS

| | | |
|---|---|---|
| 5,709,964 A | 1/1998 | Christensen et al. |
| 6,287,719 B1 | 9/2001 | Bailey |
| 7,304,453 B2 | 12/2007 | Eaves |
| 2012/0015223 A1 | 1/2012 | Bhardwaj et al. |
| 2014/0113184 A1 | 4/2014 | Hamel et al. |
| 2015/0179989 A1 | 6/2015 | Luo et al. |
| 2016/0135328 A1 | 5/2016 | Wu |
| 2016/0209659 A1 | 7/2016 | Nikkhoo et al. |
| 2016/0241048 A1 | 8/2016 | Badam et al. |

FOREIGN PATENT DOCUMENTS

EP  2175513 A1  4/2010

OTHER PUBLICATIONS

Karpin, Oleksandr, "Power Management—Cell Balancing in a Multi-Cell Li-Ion/Li-Pol Battery Charger", http://www.cypress.com/file/70891/download, Published on: Jun. 6, 2005, pp. 1-27.
"International Search Report and Written Opinion Issued in PCT Application No. PCT/US2018/038642", dated Oct. 15, 2018, 12 Pages.

*Primary Examiner* — Sarah A. Slifka
(74) *Attorney, Agent, or Firm* — Ray Quinney & Nebeker P.C.; John O. Carpenter

(57) ABSTRACT

An electronic device includes a frame and a battery. The frame is configured to be worn on a user's body. The battery is supported by the frame and includes a first cell and a second cell in electrical parallel. The first cell has a first capacity and the second cell has a second capacity that is different from the first capacity.

20 Claims, 4 Drawing Sheets

SYSTEMS AND METHODS OF HEAD-MOUNTED DEVICES WITH MIXED CAPACITY CELLS

CROSS-REFERENCE TO RELATED APPLICATIONS

N/A

BACKGROUND

Use of computing devices is becoming more ubiquitous by the day. Computing devices range from standard desktop computers to wearable computing technology and computers integrated into many commonplace devices. Due to the variety of device and applications, computing devices are being used in an ever-increasing variety of environments and conditions.

Wearable computing devices such as augmented reality (AR), mixed reality (MR), and virtual reality (VR) head-mounted displays are worn on the user's body for extended periods of time. The duration of time the user may use the wearable computing device is limited by the power supply and the comfort of the device. Increasing the battery capacity allows for longer usage sessions of the electronics, but conventionally decreases the comfort of the wearable device. The comfort is adversely affected by the increased mass, increased heat, increased moment of inertia, changes to the center of mass, or combinations thereof. The discomfort experienced by the user results in an overall decrease in the duration of usage sessions.

SUMMARY

In some embodiments, an electronic device includes a frame and a battery. The frame is configured to be worn on a user's body. The battery is supported by the frame and includes a first cell and a second cell in electrical parallel. The first cell has a first capacity and the second cell has a second capacity that is different from the first capacity.

In other embodiments, an electronic device includes a frame and a battery. The frame is configured to be worn on a user's head. The battery is supported by the frame and includes a first parallel portion and a second parallel portion in electrical parallel. The first parallel portion includes a first cell and the second parallel portion includes a second cell and a tuning resistor in series. The first cell has a first capacity and the second cell has a second capacity that is different from the first capacity.

In yet other embodiments, an electronic device includes a frame, a battery, and a thermal management device. The frame is configured to be worn on a user's body. The battery is supported by the frame and includes a first cell and a second cell in electrical parallel. The first cell has a first capacity and the second cell has a second capacity that is different from the first capacity. The thermal management device is positioned contacting at least a portion of the battery.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for improving comfort and usage time in a head-mounted device (HMD). More particularly, the present disclosure relates to providing a battery in a HMD containing a plurality of cells with varying capacities that is more volumetrically efficient. A HMD may include one or more batteries to allow a user to move freely around the user's environment without a tether to a power supply. In some embodiments, a battery may include a plurality of cells of different capacities and different dimensions. For example, a smaller capacity cell may have smaller overall physical dimensions than a larger capacity cell. The smaller capacity cell may have a smaller volume and/or at least one dimension that is smaller than a larger capacity cell.

The mixture of capacities may allow for beneficial geometries and/or arrangements of the cells. In some embodiments, the mixture of capacities may allow for a non-rectangular battery that may be more ergonomic for the wearable device. In other embodiments, the mixture of capacities may allow for thermal management of the battery and/or other electrical components near or adjacent the battery.

The smaller capacity cells and the larger capacity cells may be in electrical parallel and configured to charge and discharge at an equal relative rate during use. For example, a first cell with a 1 milliampere-hour (mAh) capacity and a second cell with a 2 mAh capacity in parallel according to the present disclosure may charge and discharge at different rates proportional to each cell's capacity. In other words, the first cell and second cell may each discharge 50% of the capacity over the same period of use, despite the nominal energy discharged being different.

Figure 1:
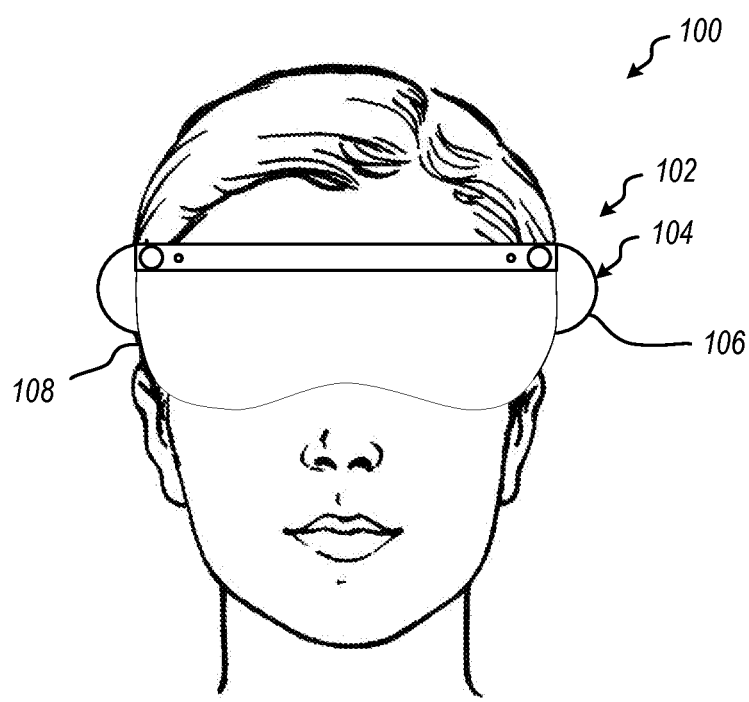
FIG. 1 is a perspective view of a user wearing an embodiment of a head-mounted device (HMD), according to the present disclosure.

FIG. 1 is a perspective view of an embodiment of a user 100 wearing a HMD 102. The HMD 102 may include a power supply in the HMD 102, allowing the HMD 102 to be untethered to a power supply. In some embodiments, the power supply may be positioned in a frame 104 of the HMD 102. The frame 104 may include a band 106 that may be positioned around at least 50% of the user's head. The band 106 may support the power supply in electronic communication with one or more electronic components. In some embodiments, the frame 104 may include a housing 108 that houses a near-eye display and other electronic components, such as one or more cameras, microphones, other sensors, a storage device, one or more processors, or other electronic components. In some embodiments, the housing 108 may support one or more power supplies in electronic communication with one or more electronic components.

The power supply may be the largest and/or most massive component of the HMD 102. Changing the total capacity and/or the size of a battery may change the distribution of mass in the HMD 102, pulling the user's head forward, backward, or in another direction and may increase fatigue during use. Increasing the mass of the battery may further increase the moment of inertia of the HMD 102, adversely impacting the comfort of the HMD 102 during movement.

Figure 2:
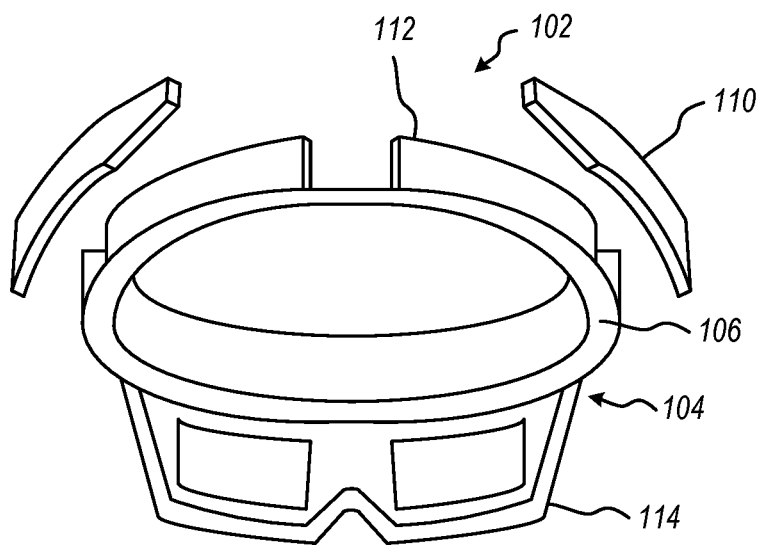
FIG. 2 is an exploded bottom perspective view of the embodiment of an HMD of FIG. 1, according to the present disclosure.

FIG. 2 is a bottom perspective exploded view of the HMD 102 of FIG. 1. In some embodiments, the HMD 102 may include one or more batteries 110 in or on the frame 104. For example, the HMD 102 may include one or more batteries 110 in the band 106 and positioned closer to the rear 112 of the HMD 102 than a front 114 of the HMD 102 to balance the mass of the HMD 102 in the forward and rearward direction.

Conventional batteries include a plurality of uniform cells that produce a substantially rectangular battery. In some embodiments according to the present disclosure, a battery 110 may have one or more tapers (e.g., in height, in thickness, etc.) that allow for more ergonomic and/or balanced battery shapes compared to conventional battery designs. For example, a battery 110 may taper in the vertical dimension in a rearward direction, producing a rear portion that is shorter in the vertical dimension than a forward portion. In such examples, the taper of the battery 110 may alter the center of mass of the battery 110 toward a more balanced position, or the taper of the battery 110 may provide clearance to adjust a circumference of the band 106 and tailor a fit of the HMD 102 to a user.

Figure 3:
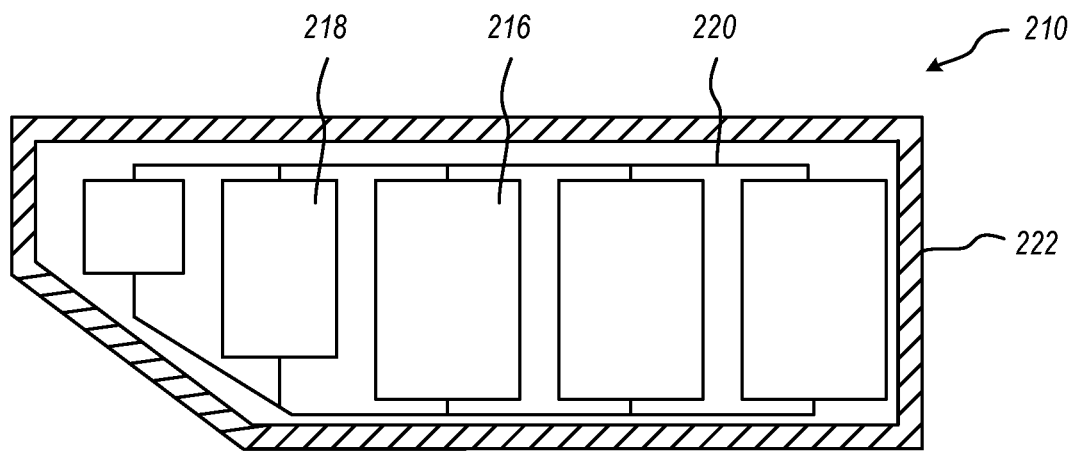
FIG. 3 is a side cross-sectional view of an embodiment of a mixed capacity battery, according to the present disclosure.

In some embodiments, the mixture of cells with different capacities may allow for more efficient volumetric density of the battery compared to conventional batteries. FIG. 3 is a side cross-sectional view of an embodiment of a battery 210 with a tapered end. The battery 210 may include at least a first cell 216 and a second cell 218 in electrical parallel by a conduit 220, where the first cell 216 has a first capacity and the second cell 218 has a second capacity that is different from the first capacity. For example, the first cell 216 in FIG. 3 is larger than the second cell 218 and the first capacity is larger than the second capacity. In other examples, the first capacity may be less than the second capacity. In some embodiments, the first capacity may be at least 5% different from the second capacity.

In some embodiments, the first cell 216 and the second cell 218 may have a capacity ratio (i.e., a first capacity to a second capacity) that is in a range having an upper value, a lower value, or upper and lower values including any of 0.5, 0.6, 0.7, 0.8, 0.9, 1.0, 1.2, 1.4, 1.6, 1.8, 2.0, or any values therebetween. For example, the capacity ratio may be greater than 0.5 (e.g., the first capacity may be at least one-half the second capacity). In other examples, the capacity ratio may be less than 2.0 (e.g., the first capacity may be less than double the second capacity). In yet other examples, the capacity ratio may be between 0.5 and 2.0. In further examples, the capacity ratio may be about 2.0. In at least one example, the capacity ratio may be about 1.25.

During testing, a mixed capacity battery (i.e., a battery having cells with different capacities) was tested with a first capacity of 1467 mAh and a second capacity with 733 mAh, having a capacity ratio of about 2.0. In other testing, a mixed capacity battery was tested with a first capacity of 3030 mAh and a second capacity with 2560 mAh having a capacity about 1.2.

In some embodiments, the mixed capacity battery may have at least one cell with a capacity in a range having an upper value, a lower value, or upper and lower values including any of 20 mAh, 50 mAh, 100 mAh, 200 mAh, 400 mAh, 600 mAh, 800 mAh, 1000 mAh, 1250 mAh, 1500 mAh, 1750 mAh, 2000 mAh, 2500 mAh, 3000 mAh, 3500 mAh, 4000 mAh, 5000 mAh, or any values therebetween. For example, a battery according to the present disclosure may have at least one cell with a capacity of greater than 20 mAh. In other examples, a battery according to the present disclosure may have at least one cell with a capacity of less than 5000 mAh. In yet other examples, a battery according to the present disclosure may have at least one cell with a capacity of between 20 mAh and 5000 mAh. In further examples, a battery according to the present disclosure may have at least one cell with a capacity of between 500 mAh and 4000 mAh.

Conventional batteries have a total capacity that is a multiple of the cell capacity. A mixed capacity battery according to the present disclosure may have a non-multiple total capacity, as the battery has different capacities in at least two cells. In some embodiments, a mixed capacity battery according to the present disclosure may have a total capacity of 40 mAh, 60 mAh, 80 mAh, 100 mAh, 200 mAh, 400 mAh, 600 mAh, 800 mAh, 1.0 Ah, 1.5 Ah, 2.0 Ah, 2.5 Ah, 3.0 Ah, 3.5 Ah, 4.0 Ah, 4.5 Ah, 5.0 Ah, 6.0 Ah, 7.0 Ah, 8.0 Ah, 9.0 Ah, 10.0 Ah, or any values therebetween. For example, the total capacity of a mixed capacity battery may be greater than 40 mAh. In other examples, the total capacity of the mixed capacity battery may be less than 10.0 Ah. In yet other examples, the total capacity of the mixed capacity battery may be between 40 mAh and 10.0 Ah. In at least one example, the total capacity may be about 10 Ah.

While a battery with mixed capacities of cells may allow for greater volumetric density of capacity compared to conventional batteries with uniform cell capacities, a mixed capacity battery may additionally allow for improved thermal management of both the battery, as well as the nearby electronics. For example, a battery exhibits greatest performance when there is little to no thermal gradient in the cells and/or between cells. In some HMDs, the confined packaging of the battery may introduce portions of the battery to greater thermal energy exposure than other portions of the battery.

Figure 4:
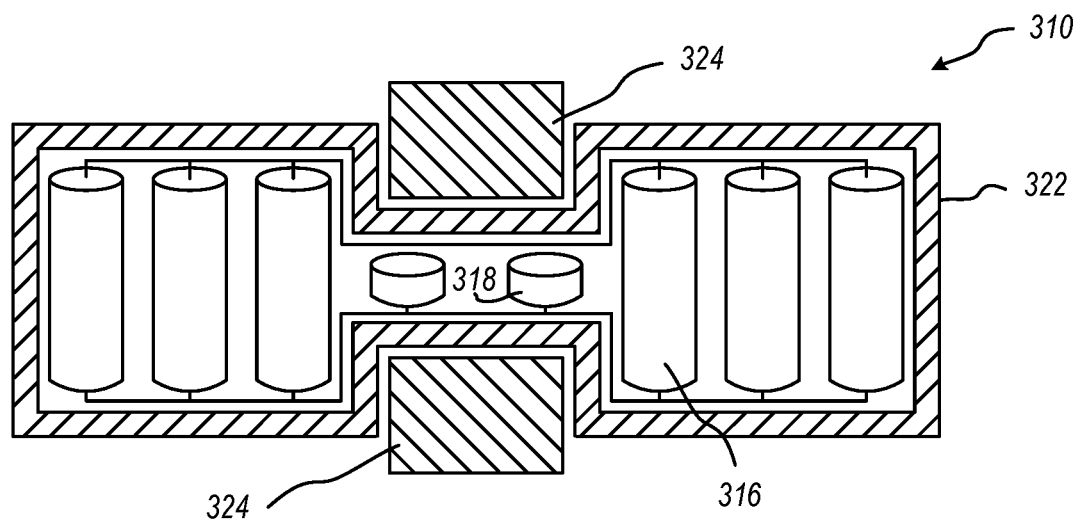
FIG. 4 is a side cross-sectional view of another embodiment of a mixed capacity battery, according to the present disclosure.

FIG. 4 is a side cross-sectional view of an embodiment of a battery 310 with at least one first cell 316 positioned in parallel with at least one second cell 318. In some embodiments, the larger, higher capacity first cell 316 may generate and/or dissipate a greater amount of thermal energy during use. For example, during use, the first cells 316 may increase in temperature more than the second cells 318. In some embodiments, electronic components 324 of the HMD may be positioned farther from the first cells 316 than the second cells 318, such that the relatively greater thermal energy of the first cells 316 may be dissipated away from the electronic components 324. Therefore, the electronic components 324 may be not exposed to the higher thermal energy of the first cells 316.

In other embodiments, the electronic components 324 of the HMD may be a source of thermal energy, and the electronic components 324 may alter the temperature of the battery 310. For example, the electronic component 324 may be one or more processors that, during use, may increase in temperature. In some embodiments, the second cells 318 may be positioned adjacent the electronic components 324, since the smaller second cells 318 may have less mass and may be cooled more efficiently than the more massive first cells 316. In other embodiments, the battery 310 and/or a housing 322 of the battery 310 may be shaped to increase to the surface area of a housing 322 at or near a portion of the battery 310 with greater thermal exposure, such as near an electronic component 324. For example, the housing 322 may include a heat spreading element that allows for the thermal energy generated by the battery 310 and/or the electronic component 324 to be more efficiently transferred and dissipated.

In yet other embodiments, the battery 310 and/or housing 322 may be shaped to accommodate the geometry of one or more electronic components. As described herein, in wearable devices, the components of the wearable device may have limited space in which the components may be packaged. While FIG. 2 and FIG. 3 illustrate an example of a tapered battery with smaller cells positioned outside (e.g., further from the center of the battery) of the larger cells, FIG. 4 illustrates another embodiment of a battery in which the smaller capacity cells are positioned in between larger cells. The capacities of cells in a mixed capacity battery according to the present disclosure may be arranged in any order or configuration desired for the packaging and/or geometry of the wearable device.

Figure 5:
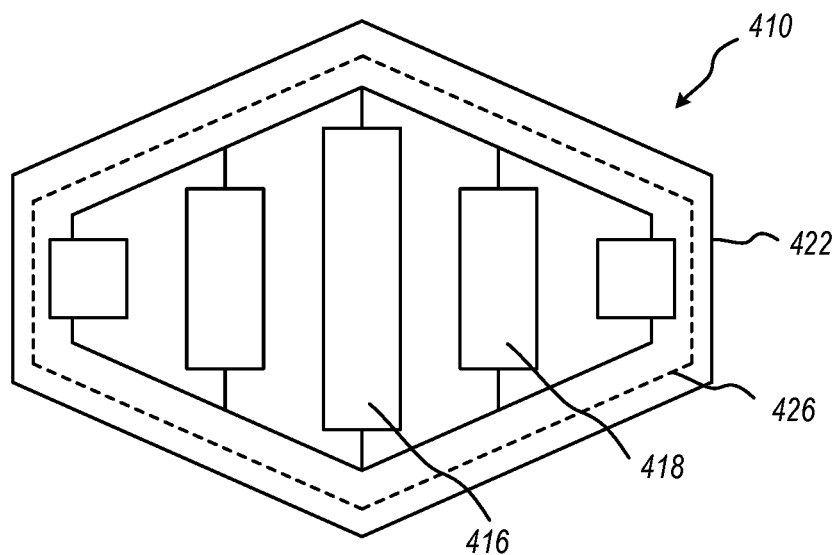
FIG. 5 is a side schematic representation of yet another embodiment of a mixed capacity battery and thermal management device, according to the present disclosure.

As described in relation to FIG. 4, the cells of a mixed capacity battery may be arranged for beneficial thermal management properties. FIG. 5 illustrates another embodiment of a mixed capacity battery 410 that includes a variety of capacity cells arranged complementarily to one or more thermal management devices 426. For example, the thermal management device may be a passive thermal management device such as a heat spreader, as described in relation to FIG. 4. In other examples, the thermal management device may be an active thermal management device, such as a cooling fan or active liquid cooling. In at least one example, the thermal management device may be a heat pipe or vapor chamber.

Some embodiments of a thermal management device, either passive or active, may transfer thermal energy more efficiently in a first geometry than in a second geometry. For example, passive thermal management heat pipes transfer thermal energy along a length of the heat pipe more efficiently in a linear direction, compared to a vapor chamber, which transfers energy more efficiently across an area. A vapor chamber moves thermal energy through the device by the movement of vapor within a sealed chamber. The movement of the vapor is at least partially based upon the thermal gradients that form in the vapor chamber housing. A contact surface of the vapor chamber with a lower aspect ratio area (i.e., length and width having a ratio of less than 3:1) and/or a radially symmetrical surface of the vapor chamber may improve thermal energy transfer. In other words, corners, such as 90-degree corners may produce regions of inefficient thermal energy transfer.

A hexagonal vapor chamber thermal management device 426, such as illustrated in FIG. 5 may allow for more efficient vapor movement through the vapor chamber. More efficient vapor movement allows for more efficient thermal transfer over the surface of the thermal management device 426. A mixed capacity battery 410 may allow for the plurality of cells 416, 418 within the battery to be sized and arranged complementarily to a vapor chamber or other thermal management device 426. In at least one embodiment, a vapor chamber or other thermal management device 426 may be at least partially within a housing 422 of the mixed capacity battery 410.

Figure 6:
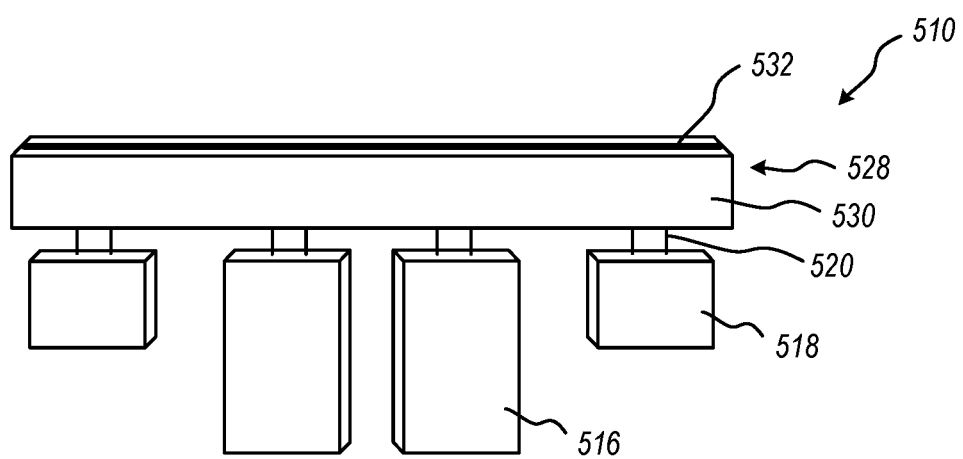
FIG. 6 is a side schematic representation of an embodiment of a flexible mixed capacity battery, according to the present disclosure.

A mixed capacity battery according to the present disclosure may further increase ergonomics of a wearable device by providing electrical communication between the cells with a flexible conductive member. FIG. 6 is a perspective view of an embodiment of a mixed capacity battery 510 for use in a HMD with at least a first cell 516 and a second cell 518 in electrical parallel via electrical conduits 520.

In some embodiments, a mixed capacity battery 510 may have a partially flexible conductive member or rigidflex member 528 that includes at least one rigid layer 530 and at least one flexible conductive layer 532. The flexibility of the rigidflex member 528 may be altered by changing the ratio of the thickness of the flexible conductive layer 532 and the thickness of the rigid layer 530. For example, the rigidflex member 528 may have one rigid layer 530, and the rigidity of the rigidflex member 528 may be increased by increasing a thickness of the rigid layer 530. In other examples, the rigidflex member 528 may include a plurality of rigid layers 530. The rigidity of the rigidflex member 528 may be increased may increasing the total thickness of the rigid layers 530, such as by increasing the thickness of one or more of the plurality of rigid layers 530 and/or by increasing the number of rigid layers 530.

A rigidflex member 528 may allow the mixed capacity battery 510 to conform to the geometry of a HMD, such as in the band of a HMD, as the band is adjusted to fit different users. In another example, the rigidflex member 528 may allow the mixed capacity battery to be standardized across multiple wearable devices, such as for use in a VR HMD, a MR HMD, and an AR HMD, while the flexibility of the battery 510 may compensate for small geometric variations between devices. In yet other embodiments, the mixed capacity battery 510 may be a removable battery from the HMD or other wearable device. The rigidflex member 528 may allow the mixed capacity battery 510 to move between an internal shape (e.g., curved) while positioned in an HMD and an external shape (e.g., straight) when removed from the HMD. The external shape may be more efficient for charging, such as being configured to fit into a charging station, may be more efficient for storage and/or shipping, such as being flat to stack more efficiently, or may have other beneficial properties.

Figure 7:
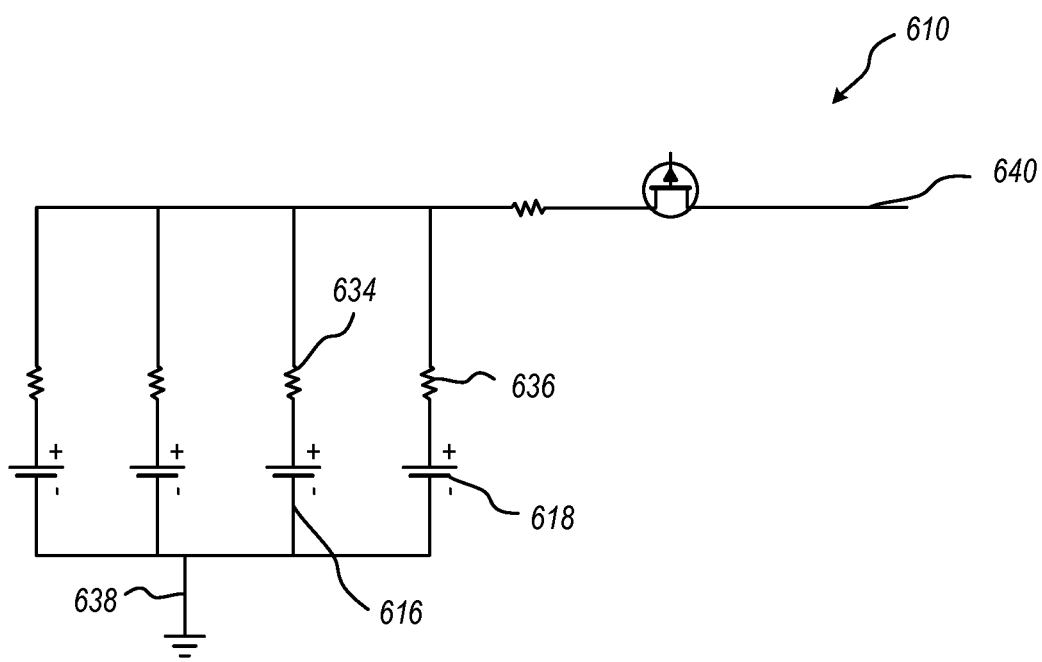
FIG. 7 is a circuit diagram illustrating an embodiment of a mixed capacity battery for use in an HMD, according to the present disclosure.

The cells of a mixed capacity battery may charge and discharge disproportionately if connected in parallel without any further electrical components in series with the cells. The relative charge/discharge rate may be modified by changing the resistance of the portion of the circuit in which each cell is positioned. For example, FIG. 7 is a circuit diagram illustrating another embodiment of a mixed capacity battery 610 according to the present disclosure.

In some embodiments, at least one tuning resistor may be positioned in series with a first cell 616 or a second cell 618. In other embodiments, the first cell 616 may have a first tuning resistor 634 and the second cell 618 may have a second tuning resistor 626. The battery 610 may have any number of cells in parallel with one another between a first terminal 638 and a second terminal 640 of the battery 610.

Each cell and tuning resistor may have a total resistance that is approximately the same in each parallel portion of the mixed capacity battery 610. For example, the total resistance of the first cell 616 and the first tuning resistor 634 may be equal to the total resistance of the second cell 618 and the second tuning resistor 636. Larger capacity cells may have a lesser internal resistance than smaller capacity cells, such that a smaller capacity cell may have a lower resistance tuning resistor in series with the smaller capacity cell than in series with the larger capacity cell to sum to an equivalent total resistance. In some embodiments, the total resistance of each parallel portion of the battery 610 may be within 5% of one another. In other embodiments, the total resistance of each parallel portion of the battery 610 may be within 3% of one another. In yet other embodiments, the total resistance of each parallel portion of the battery 610 may be within 1% of one another.

While the circuit diagram illustrates the tuning resistors 634, 636 immediately adjacent the first cell 616 and second cell 618, in some embodiments, at least one of the tuning resistors may be positioned away from the cell with which the tuning resistor is in series. As described herein, thermal management of the thermal energy produced by the mixed capacity battery 610 may be improved relative to a conventional battery. The cells 616, 618 may generate thermal energy during use and the mixed capacities of the cells may provide geometric options for thermal management of the cells.

Additionally, the tuning resistors 634, 636 may further generate thermal energy and the tuning resistors 634, 636 may be located within or at the edge of the battery 610 to provide improved thermal management of the tuning resistors 634, 636. For example, the tuning resistors 634, 636 may be smaller than a cell of the battery 610, allowing positioning of a tuning resistor at an opposite end of a battery housing while remaining in electrical series with a cell. The ability to position a tuning resistor within or outside of a battery housing may allow for the production of thermal energy in the battery to be selectively positioned to mitigate thermal gradients and/or allow improved cooling of the battery. For example, the tuning resistors may be located at or near a surface of the battery housing, where the thermal energy generated by the tuning resistors may be transferred away from the battery, mitigating the exposure of the cells to the thermal energy.

In at least one embodiment, a mixed capacity battery according to the present disclosure may allow for increased volumetric energy density of a non-rectangular battery for wearable devices, such as a HMD. In at least another embodiment, a mixed capacity battery according to the present disclosure may allow for improved thermal management by arranging the cells in a more thermally efficient manner. In at least a further embodiment, a mixed capacity battery according to the present disclosure may allow for positioning of cells that generate less thermal energy near one or more electronic components of the wearable device that generate thermal energy. More efficient thermal management may allow the wearable device to expend less energy managing the thermal energy produced. A mixed capacity battery may therefore increase the operational lifetime of a wearable device.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic device, the electronic device comprising:
   a frame configured to be worn on a user's body;
   a battery supported by the frame, the battery including:
      a first cell having a first capacity, and
      a second cell having a second capacity different from the first capacity, wherein the first cell and second cell are in electrical parallel; and
   a thermal management device positioned contacting at least a portion of the battery and in thermal communication with the first cell and the second cell to reduce a thermal gradient between the first cell and the second cell.

2. The device of claim 1, further comprising a tuning resistor in series with the second cell, and the battery has a first resistance across the first cell, a second resistance across the second cell and the tuning resistor, and the first resistance is less than 5% different from the second resistance.

3. The device of claim 1, the battery in electrical communication with a near-eye display supported by the frame.

4. The device of claim 1, the first capacity being at least 5% greater than the second capacity.

5. The device of claim 1, further comprising a third cell in electrical parallel with the first cell and second cell.

6. The device of claim 5, the third cell having a third capacity that is different from the first capacity and the second capacity.

7. The device of claim 1, the first cell being in electrical communication with the second cell through an elastically flexible member.

8. The device of claim 1, the second capacity being less than the first capacity, wherein the battery further comprises a housing that tapers toward the second cell.

9. The device of claim 1, the device having a total capacity greater than 40 milliampere-hour (mAh).

10. The device of claim 1, the device having at least one cell with a capacity greater than 20 (mAh).

11. An electronic device, the electronic device comprising:
    a frame configured to be worn on a user's head;
    a battery supported by the frame, the battery including:
       a first cell in a first parallel portion having a first capacity,
       a second cell in a second parallel portion having a second capacity different from the first capacity, and
       a tuning resistor in series with the second cell in the second parallel portion, wherein the first parallel portion is in electrical parallel with the second parallel portion; and
    a vapor chamber positioned contacting at least a portion of the battery and in thermal communication with the first cell and the second cell to reduce a thermal gradient between the first cell and the second cell.

12. The device of claim 11, the battery tapering in at least one dimension.

13. The device of claim 11, the battery being positioned in a band of the frame.

14. The device of claim 11, the battery being curved in at least one direction.

15. The device of claim 11, the battery being flexible in at least one direction.

16. The device of claim 11, the battery further comprising a third cell in a third parallel portion, the second cell being smaller than the first cell and third cell and the second cell being positioned between the first cell and third cell.

17. An electronic device, the electronic device comprising:
    a frame configured to be worn on a user's head;
    a battery supported by the frame, the battery including:
       a first cell having a first capacity, and
       a second cell having a second capacity different from the first capacity, wherein the first cell and second cell are in electrical parallel; and
    a vapor chamber positioned contacting at least a portion of the battery and in thermal communication with the first cell and the second cell to reduce a thermal gradient between the first cell and the second cell.

18. The device of claim 17, the vapor chamber having a complementary size and shape to the battery.

19. The device of claim 17, the vapor chamber being flexible.

20. The device of claim 17, the vapor chamber being within a battery housing.

* * * * *